United States Patent [19]
Haralambopoulos et al.

[11] Patent Number: 5,148,474
[45] Date of Patent: Sep. 15, 1992

[54] INTERACTIVE VALUE-ADDED TELECOMMUNICATIONS SYSTEM AND METHOD

[76] Inventors: Nancy Haralambopoulos; Costa Haralambopoulos, both of 709 English Rd., Rochester, N.Y. 14616; James R. Mills, 2500 East Ave. (Apt. No. 7X), Rochester, N.Y. 14610; Harold A. Gell, Jr., 13720 Lockdale Rd., Silver Spring, Md. 20906

[21] Appl. No.: 748,178

[22] Filed: Aug. 21, 1991

[51] Int. Cl.$^5$ .................... H04M 15/10; H04M 15/18
[52] U.S. Cl. .................................. 379/111; 379/114; 379/120; 379/201; 379/130
[58] Field of Search ............... 379/144, 111, 114, 115, 379/119, 120, 201, 202, 203, 204, 205, 206, 130, 140

[56] References Cited

U.S. PATENT DOCUMENTS

| | | | |
|---|---|---|---|
| 4,544,804 | 10/1985 | Herr et al. | 379/210 |
| 4,754,478 | 6/1988 | Leibersberfer et al. | 379/204 |
| 4,908,850 | 3/1990 | Masson et al. | 379/204 |
| 5,003,584 | 3/1991 | Benyacar et al. | 379/201 |
| 5,023,904 | 6/1991 | Kaplan et al. | 379/201 |

*Primary Examiner*—Stafford D. Schreyer
*Attorney, Agent, or Firm*—Harold Gell

[57] ABSTRACT

A interactive value-added telecommunications system including automatic billing at a value-added rate controllable in real time is realized through in-place network carrier system utilities including multiparty switching which verify a calling party by a telephone number, and optionally a PIN number, and provides for calling party authorization of billing at a rate established by the called party. The system enables a method for conducting a business wherein a party calls for a service or product, is identified via one or two separate code sequences, requests a service or product from the called provider who establishes a rate for compliance. The caller authorizes and initiates the established charge to an account associated with one of said code sequences which preferably is a telephone number associated with a credit or debit account by completing a third-party call to a designated value-added number. Confirmation of the authorization and acceptance of the charge is monitored by the provider who proceeds to provide the service or product requested at the established rate which may be changed at any time during the telephone call by the provider followed by appropriate caller authorization.

20 Claims, 1 Drawing Sheet

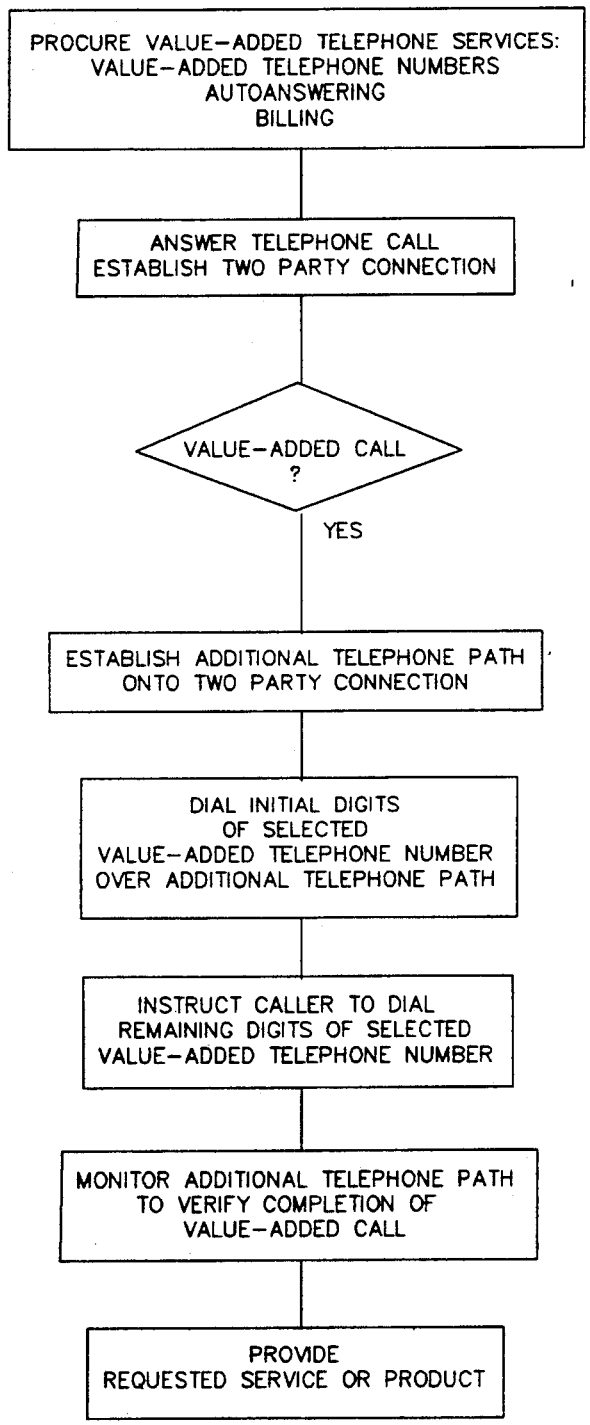

INTERACTIVE VALUE-ADDED TELECOMMUNICATIONS SYSTEM AND METHOD

FIELD OF THE INVENTION

This invention relates to a telecommunication billing method and apparatus for specifying and calculating the billing charges associated with value-added communication calls from credit or debit account telephone consumers which allows providers to make a determination with respect to a fee to be charged for a product or service and establish that fee or lack thereof in real time during a telephone conversation with the person requesting the product or service.

BACKGROUND OF THE INVENTION

This invention springs from disclosure document number 233618 filed in the U.S. Patent Office by Costa Haralambopoulos on Aug. 22, 1989, the improvements and embellishments thereto having been developed by the co-inventors during the period running from the inventions original conception to the filing date of this application.

The new value-added services (generally referred to as 700 or 900 number services) are designed for mass calling to a service provider number with the calling party paying for the call. These value-added services [e.g., DIAL-IT 900-service offered by American Telephone and Telegraph Co. (AT&T)] allow service providers to offer a variety of value-added telecommunication services (Dial-A-Prayer, Televoting, etc.), to their clientele for which additional charges are assessed. To access the service, the caller dials a 900-XXX-XXXX number and is routed to a Carrier Switch Network (CSN) Mass Announcement System (MAS) where the callers listen to the service provider's prerecorded announcement. The service providers select the rate callers will pay for the service when the 700 or 900 number is assigned by the CSN. The value-added number and the rate selected by the service provider are stored in a rate table in a CSN billing system. When a call is made to a service provider's value-added number, the central office switching system in the Local Exchange Company (LEC) makes a call record including the calling and called party of each call. These call records are transported periodically (typically every month) from the LEC to the CSN, and rated using the appropriate service provider's rate table. This rating process involves a table look-up process to determine each caller's charge for a call to a particular service provider's number. The resulting caller charge records are then returned to the LEC which includes the charges as part of the caller's monthly bill.

More advanced carrier network services provide the service provider more flexibility in defining their services by routing the value-added calls to a service provider-selected location. One such service is the Multi-Quest telecommunications service offered by AT&T. These new services enable a service provider to provide a greater variety of value-added services which may now include interactive dialog between the caller and the called service provider.

Thus modern technology has provided automatic telephone systems which include automatic billing combined with value-added rate billing arranged so a called party may receive a portion of the monies billed to a calling party for the product or services provided to the calling party. These systems which function as a fee collection mechanism for entities providing services over telephone exchanges are contemporarily identified as 700 or 900 value-added exchanges. In prior art value-added exchange systems, a calling party is advised of a charge when a value-added exchange is dialed. That charge may be a fixed fee or a timed rate charge. The charge is added to the caller's telephone bill and the telephone company functions as a fee collector for the service or product provider.

The current value-added exchange practice allows telephone service providers to be guaranteed payment for the services or product which they provide but these systems offer limited flexibility with respect to rates charged.

OBJECTIVES OF THE INVENTION

Therefor, it is a primary objective of the present invention to provide a means whereby a provider may alter the rate charged to a calling party in real time during the progression of the call.

It is a further objective of the present invention to provide a means whereby a calling party may be billed via a credit or debit account at a rate or rates established by a service or product provider during the course of a telephone conversation.

Another objective of the present invention is to provide a means where a called provider may advise a calling party of an intent to charge a fee via the telephone billing system and monitor the calling party's consent to accept the billing.

Another objective of the present invention is to provide a means for purchasing a plurality of products or services from a provider via an automatic telephone billing system which maintains a credit account for telephone subscribers.

Another objective of the present invention is to provide a means for purchasing a plurality of objects or services from a provider via an automatic telephone billing system which maintains a debit account for telephone subscribers.

Another objective of the present invention is to provide a system wherein a called party may request a calling party to dial a third number which is a value-added exchange number to complete a conference telephone call wherein the purpose of the value-added exchange number is simply to bill the calling party at the rate established by the called party as a function of the value-added number which the calling party is instructed to dial.

SUMMARY OF THE INVENTION

This invention presents a means whereby a product or service provider may bill a credit or debit account of a calling party via the telephone service company's automatic billing system. It comprises an operating sequence where a calling party dials a service provider number, is advised by the service provider of the fee to be charged and in response to a service provider's instructions dials to complete a value-added exchange number to effect a three party network interconnection (conference call). The fee charge may be terminated any time during the conversation by the service provider causing the value-added exchange number to be terminated or hung up via his control of the conference connection. If required, the caller may be instructed to dial a different value-added number to reflect a different.

charge. Verification of the calling party dialing the proper value-added number is monitored by the service provider by a readout means which identifies the dial tone of the service requester's third number dialing function and displays the dialed telephone number. Alternately, the service provider may be advised of the proper value-added exchange connection by a brief recorded message which comes on line as soon as the value-added exchange call is completed.

DESCRIPTION OF THE DRAWINGS

The single illustration diagrams the method, logical control and flow of information and automatic billing data comprising the subject invention.

DETAILED DESCRIPTION OF THE INVENTION

The following is a detailed description of the best modes presently contemplated for carrying out the invention. The description is intended to be merely illustrative of the invention and is not to be taken in a limiting sense. The scope of the claimed invention is best determined by reference to the language of the accompanying claims.

In accordance with the billing method and apparatus of the present invention, service providers are provided with more flexibility in the billing of the service provider's value-added service's. Billing flexibility is achieved in accordance with the invention by employing a plurality of individual value-added numbers and requiring the caller to dial the appropriate number or numbers via a conference call switching connection.

One feature of the present invention enables the service provider call billing parameter (e.g., call rate data either flat or per rate interval) to be changed in real time. In one embodiment, the billing system is incorporated in the carrier switch network (CSN). The network (CSN) permits the service provider to connect to the network's conference support system in real time to enable a caller to access a service providers value-added numbers which specify the call rate. The service provider-specified call billing parameters are then incorporated into the standard Automatic Message Accounting (AMA) record generated by CSN for each call and sent to the billing system which processes the service provider charges for inclusion in the network bill sent to the customer.

Using this invention, callers can charge value-added calls to their telephone number, carrier provided credit cards, commercial credit cards (e.g., American Express, Visa, Mastercard), or use Service Provider-Created Credit cards for the service. This invention also permits a convenient scheme for the service providers to create and maintain their own specialized credit cards to meet the unique needs of their service. The network provides the authorization, validation, billing and collection services for the service provider's credit card.

The present invention also allows the service provider to vary the charges for a value-added call at any time. The service provider may define the rates prior to the call set-up and modify the charges associated with the call while the call is in progress.

The system is typically used by a doctor, lawyer or accountant who provides personalized information to clients but it may be used by retailers providing goods. A typical scenario follows:

A customer, client or patient wishes a product or information. In this case the objective is information from a patient's doctor and the renewal of a prescription to be telephoned to a local pharmacist. The patient calls the doctor's service telephone number and the call is automatically answered. When answered, the telephone number of the calling patient is determined electronically and compared to a patient data base in the doctor's data processing system. If the patient is not calling from a registered number telephone identifying the patient, the automatic answering system asks the patient to key in his home telephone number and a third-number billing is established to the caller's home telephone number. If a proper telephone number is not detected either automatically or when manually entered, the telephone call is switched to a receptionist line or alternately, the calling party may be given a different telephone number to call to establish a client relationship with the service provider.

When the home telephone number is recognized either by automatically querying the incoming telephone line or by a manual entry through the touchtone dialing pad of the caller to establish a third-party billing to the caller's home number, the system determines if more than one patient uses the telephone number. If the answer is in the affirmative, it automatically requests an additional code to identify which of a plurality of patients is on the line. This step of the operation is performed only if more than one person uses the same home phone number such as might be the case in a family.

Once the patient is identified either by the response to the query or in the case of a single patient/ telephone number situation, the calling patient is advised that the call may involve a service charge. If the patient is willing to pay the service charge, he must press an appropriate key on his telephone. Failure to press the appropriate key terminates the telephone call with an appropriate message or transfers the call to a receptionist.

Once the calling party has signified a willingness to pay a fee, the patient information accessed from the service provider's data base is displayed on a screen at the doctor's telephone work station or a technician's telephone work station. The display includes all of the patient related data such as first name, types of ailments or other situations relevant to the particular client, any medication that has been prescribed and its frequency and the results of laboratory tests, x-rays or other diagnostic procedures. With all the pertinent data in front of the service provider, the service provider answers the telephone call and the calling party makes his request. The service provider advises the calling party of the fee, if any, that will be required for the service. It may be a time dependent rate or fixed fee or both. The calling party is advised that if this is acceptable he must press a predetermined key and if applicable, enter a personal identification number to signify the willingness to accept the charge on his telephone bill. When the system receives the acknowledging key stroke signal, the receiving line is muted while the calling party keys in their PIN number. This is a safety requirement so that the PIN number cannot be detected by an electronic device in the service provider's network. Once a proper PIN number has been detected, the line is reconnected. If the proper PIN number is not entered, a warning is given to the calling party to reenter the PIN number. If the proper PIN number is not entered after a predetermined number of tries, the call is transferred to a receptionist or terminated.

Once the proper PIN number has been entered by the calling party, the call is reconnected to the service provider and the information requested is given to the caller and/or appropriate action taken with respect to forwarding a prescription to a druggist etc. If, during the course of the conversation where services are provided, a situation occurs where a rate change is required, such as a situation where the provider chooses not to charge further for the call, the provider may enter a special code to terminate charging. Alternately, if the provider decided not to charge the patient initially, but at some time during the course of the call a situation arises where the patient should be charged, the service provider advises the caller that he is going to have to pay a fee and requests acceptance through the callers keypad. The charge is accepted by the caller's completion of a conference call to a value-added exchange number in response to the service providers instructions.

The system is implemented through a method of operation which combines the various services provided by telephone service providers in a new and unique way. It is built around the conference call utility such as presented in U.S. Pat. Nos. 4,754,478 or 4,544,804; automated billing systems such as U.S. Pat. No. 4,908,850 and the value-added area code exchange concept whereby callers are billed directly by the telephone company at established rates as described more completely in "Announcing a Telecommunications Breakthrough for Caller Paid Services:AT&T Multi-Quest", BP 3308-1, December 1988 or U.S. Pat. No. 5,003,584. According to the method presented by this patent, a requester calls a doctor, lawyer, or other service or product provider to established the first two parties of a conference call. During the course of the conversation, if it is determined that the caller is to be charged, the service provider advises the caller to dial a value-added exchange number. When the calling party dials the value-added exchange number, he is provided with a brief warning message which repeats the rate he is being charged. The service provider hears this message and may use it as confirmation that the calling party has dialed the requested number to establish a three-way conference call. The third line on this conference call is the value-added number and after its brief recorded message it remains silent. Its only function from this point on is to provide automatic billing for the time during which the services are provided. In a preferred embodiment, the service provider has a plurality of individual value-added telephone numbers with each number representing a different billing rate to reflect services to be rendered. In addition to time related billing rates, the service provider may have numbers which enable a single item charge. For instance, if the service provider is a doctor, he may have three different time dependent billing rates for clients depending on the types of information required and a single use rate for prescription renewals whereby if someone calls in simply for a prescription renewal, he will be billed the rate for that specific service after he dials the requested value-added number. If the caller requests additional information that should be billed at one of the doctor's rates, the caller is requested to dial an additional value-added number and a four-way conference is established. The first line being the caller's line, the second line being the service provider's line, the third line the single rate call whereby a charge is made for the prescription service and the fourth line is a time related charge to cover the cost involved for the conference with the doctor.

Another application of the invention is to provide a variable rate charge for call forwarding or message services. For instance, a doctor may use the system to discourage nuisance patient calls by establishing a plurality of charges based on response time requested and time of day. In this embodiment, an automatic or manual answering service asks the calling patient if the call can be returned during the normal course of business, within a time period such as one hour or if it is an emergency requiring an immediate response. The caller is advised of the charge for the special service and asked to dial a digit which completes a third-party call to the proper value-added number and selects the service desired while automatically setting the rate. This system may be time dependent to charge different rates for special response time services dependent on time of day to further discourage callers requesting an immediate response during the doctors off duty hours or late at night.

The system may be used to order items from a retail provider. For instance, in one embodiment the system is used by a home delivery pizza operation. A purchaser calls the pizzeria and places an order. The provider requests the caller to dial specific digits to complete value-added numbers which define and bill the cost of the pizzas order. The order is confirmed by the provider listening to the completion of the value-added numbers as signified by the recorded message each number provides when connected to the conference network. As each value-added call is completed, the caller is automatically billed the specified amount to prepay via his credit or debit account. The calls may be terminated any time after connection and the pizzas delivered as prepaid items. This system maybe used to order a variety of items from providers. The only requirement being that the provider must have a series of value-added numbers to reflect the various costs involved.

The foregoing illustrates embodiments of the system wherein a requester calls from his home or office telephone number which is to be billed for the service or product. If, the requester is not at his own telephone, the same process may be used if the caller uses an operator assisted or automatic billing facility wherein the service requester dials the phone number to be charged and his personal identification number supplied by the telephone company. This establishes the call origination billing using the existing long distance and credit card calling functions of telephone exchanges and combines those functions with the conference calling and value-added exchange concepts previously described.

In a preferred execution of all embodiments, the called provider's equipment establishes a conference network switched path over which a root value-added number is dialed. The caller requesting a service or product is then instructed to dial the number or numbers required to complete the call. The carrier switched network (CSN) identifies the calling party to be billed at the completion of the dialing operation and because the requesting party completed the dialing operation, he or she is billed according to the value-added rate in the CSN's look-up table. The provider's equipment may be an automatic answering system including voice responsive functions and call forwarding or a completely manually operation with a standard telephone or any combination of automatic or semiautomatic appliances.

Various techniques may be used by providers to obtain the greatest flexibility in pricing at the lowest possible value-added line lease cost. For instance, if a charge rate of from 1 to 9 dollars is to be set, the provider establishes the conference network and dials all but the last digit of one of 9 value-added telephone numbers. The caller is then instructed to dial the last digit which completes the conference call to a value-added number for which the caller will be billed as explained above. If the rate to be charged is greater than 9 dollars, the provider dials all but the last digit of a value-added number selected from a group of ten not including the first set of 9 and instructs the caller to dial the digit which completes a conference call to a value-added number preset to 10 to 90 dollars in 10 dollar increments. By instructing the caller to complete first one value-added number and then another, any value between 1 and 99 dollars may be set. Other coding schemes may be used to meet the billing requirements of the service provider. The proceeding is given by way of example only.

What has been described are preferred embodiments of the invention. Other methods, sequences or arrangements can be used to implement the present invention by those skilled in the art without departing from the spirit and scope of the present invention.

We claim:

1. A method of operating a system for billing a caller for value-added charges incurred during a call made over a communication network to a provider of services or products, including the steps of:
   answering a telephone call from said caller;
   establishing an additional telephone path onto the existing connection made by answering said call from said caller; and
   directing said caller to dial a number to complete initiation of a telephone call over said additional telephone path and said existing connection to a predetermined value-added telephone number.

2. A method of operating a system for billing a caller for value-added charges as defined in claim 1, including the steps of:
   procuring value-added telephone services from a telephone carrier switching network supplier, said services including said predetermined value-added telephone number and related answering and billing services.

3. A method of operating a system for billing a caller for value-added charges as defined in claim 2, wherein said step of procuring value-added telephone services from a telephone carrier switching network supplier includes obtaining a plurality of predetermined value-added telephone numbers and related answering and billing services.

4. A method of operating a system for billing a caller for value-added charges as defined in claim 3, wherein said predetermined value-added telephone number which said caller is directed to complete is selected from said plurality of value-added telephone numbers; and
   each of said plurality of value-added telephone numbers is established to bill at a different value-added rate.

5. A method of operating a system for billing a caller for value-added charges as defined in claim 3, including the steps of:
   establishing a plurality of additional telephone paths onto the existing connection made by answering said call from said caller; and
   directing said caller to dial a second number to complete initiation of a second telephone call over a second one of said plurality of additional telephone paths and said existing connection to a predetermined second one of said plurality of value-added telephone numbers.

6. A method of operating a system for billing a caller for value-added charges as defined in claim 4, wherein said value-added rates are fixed rates.

7. A method of operating a system for billing a caller for value-added charges as defined in claim 4, wherein said value-added rates are time dependent accumulating rates.

8. A method of operating a system for billing a caller for value-added charges as defined in claim 4, wherein said value-added rates include both time dependent accumulating rates and fixed rates.

9. A method of operating a system for billing a caller for value-added charges as defined in claim 1, including the steps of:
   dialing all but the last digit of said predetermined telephone number, and said step of directing said caller to dial a number to complete initiation of a telephone call over said additional telephone path and said existing connection is comprised of an instruction to dial a single digit.

10. A method of operating a system for billing a caller for value-added charges incurred during a call made over a communication network to a provider of services or products, including the steps of:
    answering a telephone call from said caller;
    establishing an additional telephone path onto the existing connection made by answering said call from said caller; and
    directing said caller to dial a number to complete initiation of a telephone call over said additional telephone path and said existing connection to a predetermined value-added telephone number which charges the value-added against said callers debit account.

11. A method of operating a system for billing a caller for value-added charges as defined in claim 10, including the steps of:
    procuring value-added telephone services from a telephone carrier switching network supplier, said services including said predetermined value-added telephone number and related answering and billing services.

12. A method of operating a system for billing a caller for value-added charges as defined in claim 11, wherein said step of procuring value-added telephone services from a telephone carrier switching network supplier includes obtaining a plurality of predetermined value-added telephone numbers and related answering and billing services.

13. A method of operating a system for billing a caller for value-added charges as defined in claim 12, wherein said predetermined value-added telephone number which said caller is directed to complete is selected from said plurality of value-added telephone numbers; and
    each of said plurality of value-added telephone numbers is established to bill at a different value-added rate.

14. A method of operating a system for billing a caller for value-added charges as defined in claim 12, including the steps of:
  establishing a plurality of additional telephone paths onto the existing connection made by answering said call from said caller; and
  directing said caller to dial a second number to complete initiation of a second telephone call over a second one of said plurality of additional telephone paths and said existing connection to a predetermined second one of said plurality of value-added telephone numbers.

15. A method of operating a system for billing a caller for value-added charges as defined in claim 13, wherein said value-added rates are fixed rates.

16. A method of operating a system for billing a caller for value-added charges as defined in claim 13, wherein said value-added rates are time dependent accumulating rates.

17. A method of operating a system for billing a caller for value-added charges as defined in claim 13, wherein said value-added rates include both time dependent accumulating rates and fixed rates.

18. A method of operating a system for billing a caller for value-added charges incurred during a call made over a communication network to a provider of services, including the steps of:
  procuring value-added telephone services from a telephone carrier switching network supplier, said services including leasing value-added telephone numbers and related answering and billing services;
  answering a telephone call from said caller;
  establishing an additional telephone path onto the existing connection made by answering said call from said caller; and
  directing said caller to dial a number to complete initiation of a telephone call over said additional telephone path and said existing connection to a predetermined value-added telephone number selected from a group of said leased numbers, each of which results in billing at a different rate.

19. A method of operating a system for billing a caller for value-added charges as defined in claim 18, including the steps of:
  dialing all but the last digit of said predetermined telephone number, and
  said step of directing said caller to dial a number to complete initiation of a telephone call over said additional telephone path and said existing connection is comprised of an instruction to dial a single digit.

20. A method of operating a system for billing a caller for value-added charges as defined in claim 18, wherein said value-added charges are incurred for call forwarding message services and said caller is instructed to dial a digit related to a billing rate based on the said callers requirements for a return call within a predetermined time period.

* * * * *